United States Patent [19]

Kendig

[11] Patent Number: 5,266,623

[45] Date of Patent: Nov. 30, 1993

[54] METHOD AND APPARATUS FOR INHIBITING THE DISBONDING OF A PAINT FROM METAL SURFACES

[75] Inventor: Martin W. Kendig, Thousand Oaks, Calif.

[73] Assignee: The United States of America as represented by the Secretary of the Navy, Washington, D.C.

[21] Appl. No.: 896,695

[22] Filed: Jun. 10, 1992

[51] Int. Cl.⁵ .............................................. C08K 5/32
[52] U.S. Cl. ..................................... 524/236; 428/626
[58] Field of Search .......................... 524/236; 428/626

[56] References Cited

U.S. PATENT DOCUMENTS

| | | | |
|---|---|---|---|
| 3,686,113 | 8/1972 | Burke, Jr. | 524/236 |
| 4,070,325 | 1/1978 | Burke, Jr. | 524/236 |
| 4,602,052 | 7/1986 | Weber et al. | 524/236 |
| 4,959,277 | 9/1990 | Saeki et al. | 428/623 |
| 4,962,004 | 10/1990 | Shyu | 428/626 |

*Primary Examiner*—Paul R. Michl
*Assistant Examiner*—Edward Cain
*Attorney, Agent, or Firm*—James T. Busch; Alfons F. Kwitnieski; Thomas E. McDonald

[57] ABSTRACT

A method and material for coating metal surfaces which prevents disbonding of the coating and metal surface. A polymer coating material has high molecular weight cations added thereto and can be used to paint steel or other metal surfaces subject to cathodic ionization.

4 Claims, 3 Drawing Sheets

METHOD AND APPARATUS FOR INHIBITING THE DISBONDING OF A PAINT FROM METAL SURFACES

BACKGROUND OF INVENTION

Organic coatings provide one of the most cost effective means for corrosion protection of structural alloys and are used extensively in both commercial and military applications. The patent to Saeki, et al U.S. Pat. No. 4,959,277 discloses one method of using organic coating over steel to prevent corrosion. Various acrylic and other resin films are disclosed for use over zinc-coated steel. Saeki does not disclose the addition of cations in the organic phase to inhibit disbonding. Anticipated changes in coating technology brought about by environmental concerns for excessive volatile organic content of paints require rapid assessment of coatings to replace environmentally hazardous systems. Simplifying coating processes by eliminating surface conversion layers now required for adhesion of paints to steel would provide a benefit to manufacturing and structural maintenance. A critical need exists, therefore, to prolong the life of organic coatings on steel in a corrosive environment. The patent to Shyu U.S. Pat. No. 4,962,004 discloses the use of ammonium ions on a small scale to inhibit electochemical reduction of a polymide during an electoplating process. Shyu is directed to adding ammonium ions to the electoplating solution for a circuit board which includes gold and does not contemplate using a high molecular weight quaternay ammonium compound as in addition to an organic phase polymer for preventing disbonding of a polymer-steel interface. Shyu does not contemplate the use of his invention for large structural items envisioned as by the present invention.

Although the barrier nature of organic coatings plays a role in protecting the steel substrate, it must be recognized that adhesion and molecular blocking of active sites on the surface are crucial for providing corrosion resistance, and may actually determine the ultimate life of the coating system. The concept of the paint film as an impermeable membrane is largely discredited by permeability data for water and oxygen. Clearly, adhesion or maintenance of an intimate molecular contact between a low dielectric constant, non-conducting organic material and a metal substrate diminishes the rate of corrosion of the metal despite the apparent facility of corrodents such as oxygen and ionic solutes to permeate the organic matrix.

SUMMARY OF INVENTION

It is an object of this invention to inhibit the corrosion induced degradation of adhesion of organic coating/metal systems. More particularly a method of inhibiting the disbonding of an organic polymer-steel interface is contemplated. The preferred method of inhibiting the polymer-steel bond is by incorporating solvated or grafted positively charged organic cations into the polymer. The force of adhesion of an aqueous phase (pH 9.6 borate) to steel in the presence of a xylene solution of hydroxy-terminated polybutadiene increases below the potential of zero charge ($-550$ mV vs Ag/AgCl). Incorporation of a high molecular weight quaternary ammonium cation in the xylene phase inhibits displacement of the organic phase at cathodic potentials. A further object of the invention is to make a paint which contains organic polymers and positively charged ions so that when it is applied over a metal the tendency toward disbonding is inhibited.

DESCRIPTION OF PREFERRED EMBODIMENT

Before developing our method of preventing disbonding of a polymer at a metal interface, it was necessary to understand what takes place during the displacement of polymers from metallic surfaces under electrochemical polarization. Hence, wetting experiments were performed in which the force/perimeter ratio, F/P, for an oxalic acid chemically polished steel cylinder, immersed and extracted at 5 m/s from a fluid comprised of approximately 0.15 cm layer of xylene containing 0.675 weight percent of hydroxy-terminated polybutadiene over a pH 9.6 borate electrolyte, was measured against the extension.

Figure 1A:
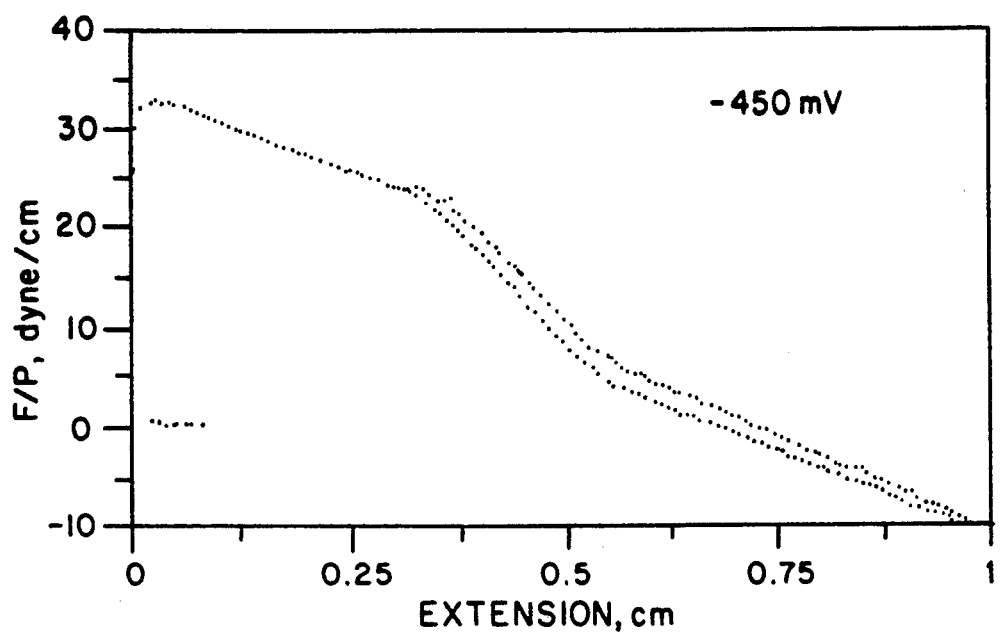
FIG. 1A is a plot of the force/perimeter ratio vs. the extension for steel in the presence of a polymer containing layer at $-450$ mV.
Figure 1B:
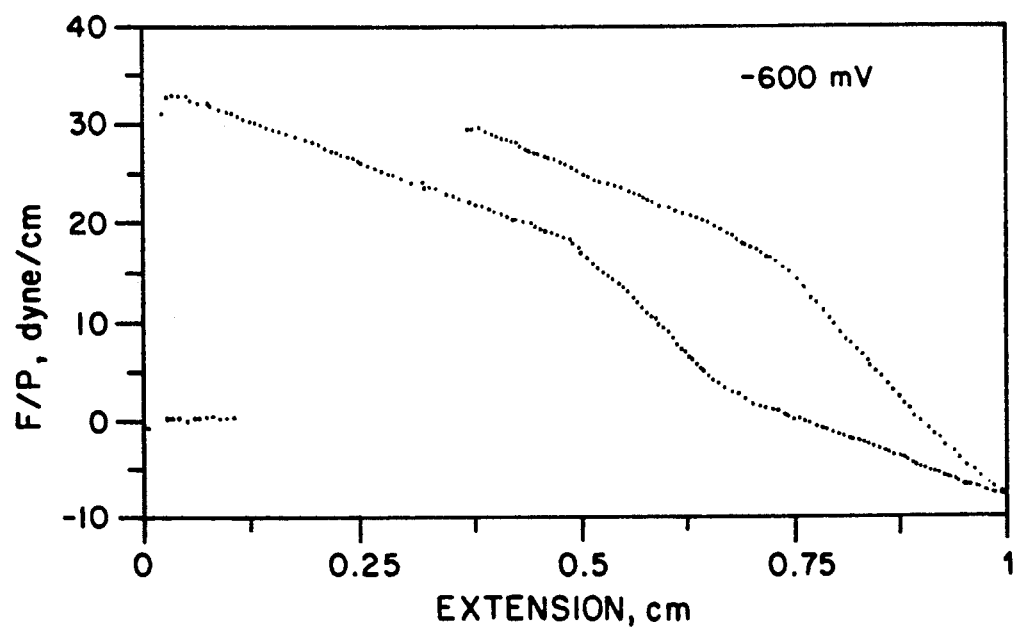
FIG. 1B is a plot of the force/perimeter ratio vs. the extension for steel in the presence of a polymer containing layer at $-600$ mV.

FIGS. 1A and 1B show the resulting F/p vs. extension of the sample into a layered liquid medium curves for a set of experiments with the xylene layer containing 0.675 weight percent of the hydroxy-terminated polybutadiene.

FIG. 1A is representative of potentials under $-600$ mV which exhibit little hysteresis and remain hydrophobic, i.e., a decrease in F/p in the electrolyte phase even upon its withdrawal.

FIG. 1B on the other hand which is representative of potentials equal to or more negative than $-600$ mV exhibits considerable hysteresis.

Figure 2A:
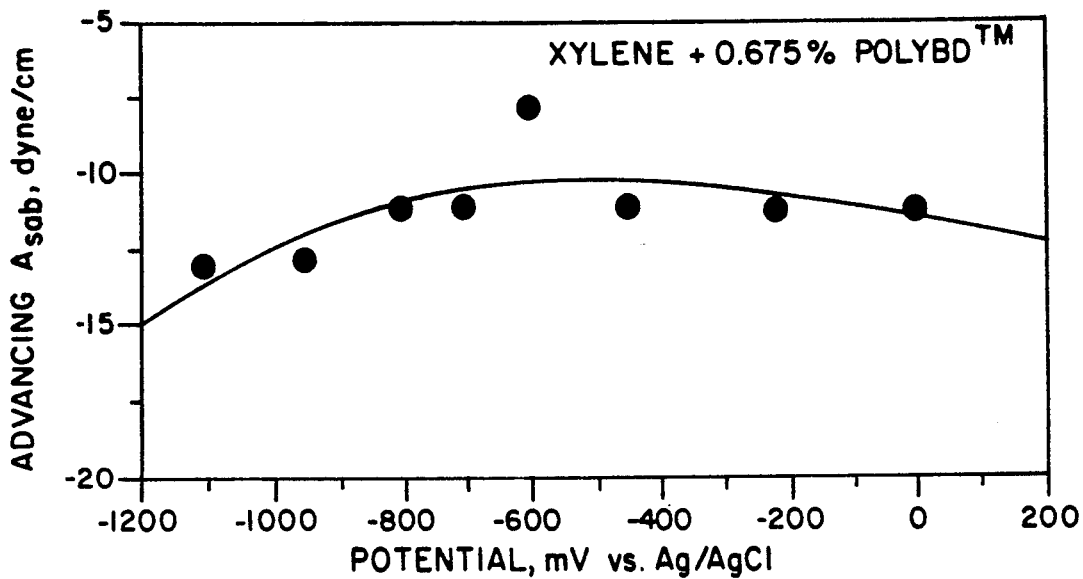
FIG. 2A shows the advancing adhesion tension vs. the potential for steel in the presence of a polymer containing layer.
Figure 2B:
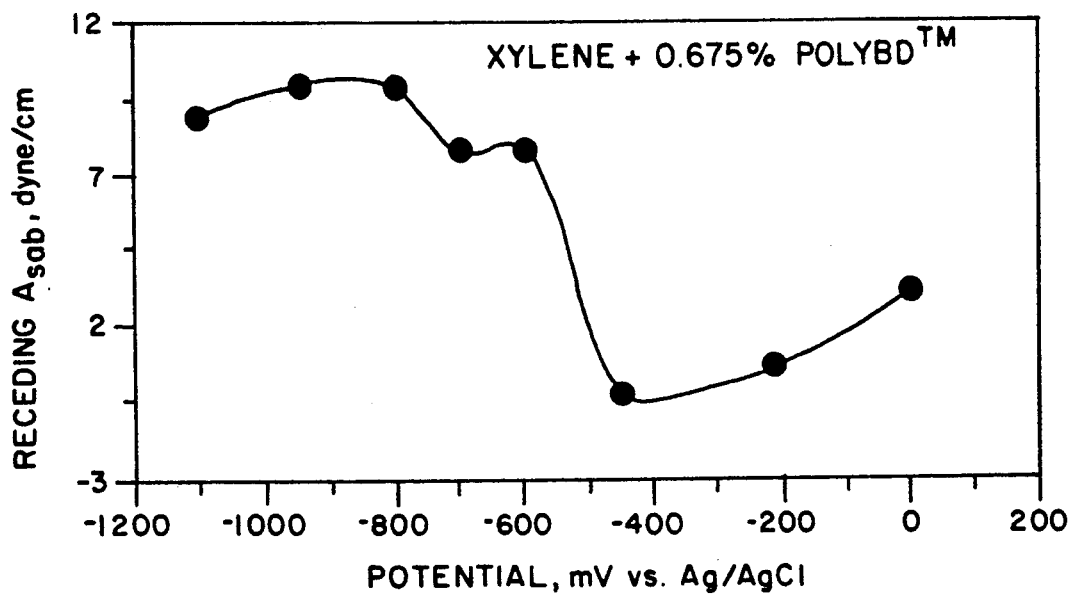
FIG. 2B shows the receding adhesion tension vs. the potential for steel in the presence of a polymer containing layer.

The results for the wetting experiments of FIG. 1 are summarized in FIG. 2 in which all potentials are referenced to a a known potential standard such as Ag/AgCl in terms of the potential dependence of $A^1_{sab}$ and $A^r_{sab}$, the advancing and receding adhesion tensions for the electrolyte to the steel in the presence of the polymer-containing organic xylene layer. $A^a_{sab}$ remains negative and nearly potential independent showing uniform hydrophobic behavior for the steel as a result of polymer adsorption at the surface. However, with receding contact, $A^r_{sab}$ is near zero dyne/cm for potentials above $-600$ mV while below $-600$ mV, $A^r_{sab}$ steps to about 10 dyne/cm. These results show that the hydrophobic behavior is retained even after passing through the electrolyte when the potential is sufficiently high, but cathodic polarization to potentials more negative than $-550$ mV causes the sample to become hydrophilic evidenced by an increased $A^r_{sab}$. The transition from hydrophilic to hydrophobic occurs sharply at $-550$ mV vs Ag/AgCl. Above −550 mV the polymer remains irreversibly adsorbed on the steel, keeping it hydrophobic, whereas below −550 mV the polymer desorbs and the steel becomes hydrophilic for receding contact.

Figure 3:
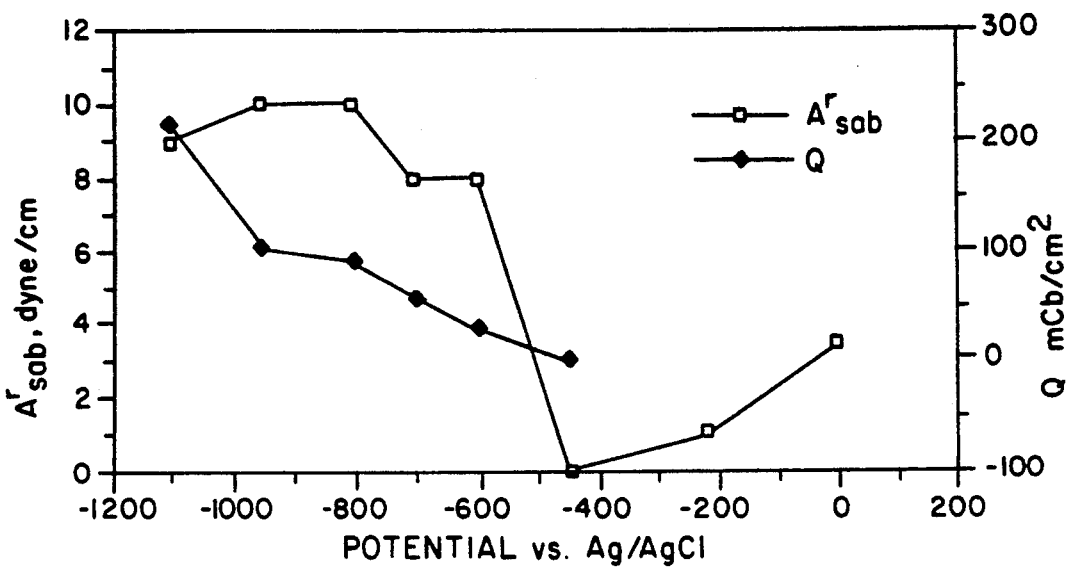
FIG. 3 plots the integrated faradaic charge Q that passes during the wetting as a function of potential.

The integrated Faradaic charge, Q, that passes during the wetting experiment as a function of potential appears in FIG. 3 along with $A^r_{sab}$. Q measures the extent of the cathodic reaction during the test. For potentials more negative than −1000 mV the charge rapidly increases as the hydrogen formation starts to dominate the electrode kinetics. Below this potential the predominant reaction is the oxygen-limited reduction. $A^r_{sab}$ shows a step between −450 and −600 mV and does not increase for more negative potentials. $A^r_{sab}$, therefore, does not appear to directly follow the cathodic reaction.

The sharp change in the wetting behavior as measured by $A^r_{sab}$ over a very short potential region around −550 mV vs. Ag/AgCl suggests that the ability of the electrolyte phase to displace the polymer as adsorbed from the xylene solution relates to the potential of zero charge (pzc) for the steel. Below the pzc the steel-electrolyte interface attains a negative charge and tends to displace a polymer that has a negative zeta potential, whereas above the pzc the positively charged steel surface retains a good bond to the adsorbed polymer.

Figure 4:
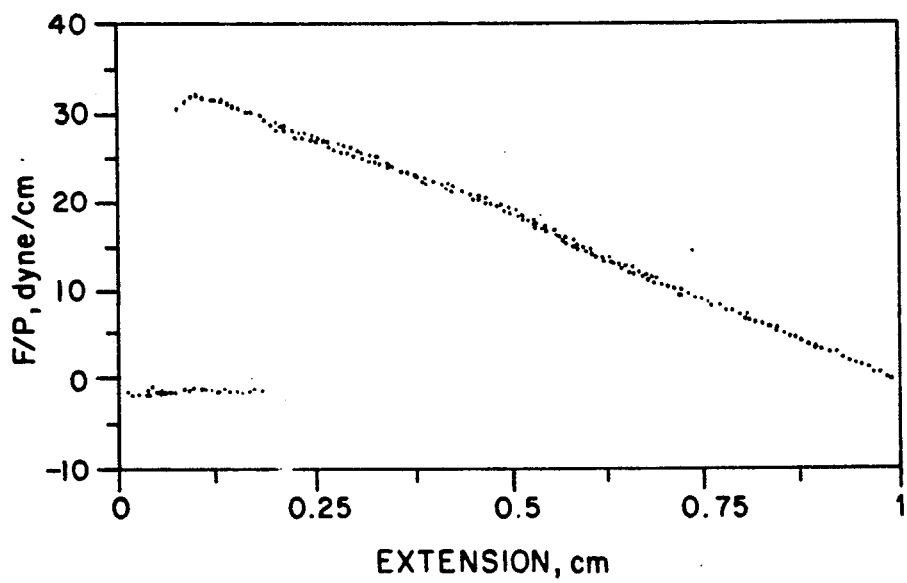
FIG. 4 is a plot of the force/perimeter v. extension for steel with a polymer layer to which a positive charge has been added in accordance with the invention.

The preceding shows that at cathodic potentials more negative than −550 mV Ag/AgCl in pH 9.6 borate the steel surface has a net negative charge that repels the polymer. The polymer must, therefore, have a negative zeta potential. To overcome our experimental results, a large molecular weight organic cation, the long chain alkyl quaternary ammonium compound, Adogen TM 464, was dissolved in the organic phase along with the hydroxy-terminated polybutadiene polymer. F/p vs. extension for the steel sample as it passes through the respective liquid layers with a polarization to −1100 mV in the electrolyte layer appears in FIG. 4. The Adogen TM decreases the surface tension of the xylene/electrolyte interface, $Y_{xe}$, as compared to that for the xylene solution of the polymer containing no Adogen TM. As a result no dramatic decrease in F/p occurs when the sample traverses the organic/aqueous interface as occurs for the solution with no Adogen. However, as the sample is withdrawn from the solution, F/p increases only at a rate consistent with buoyancy changes. No dramatic increase in F/p at reversal occurs. This differs from the observation for no Adogen (FIG. 1B) where a large increase in F/p occurs. For the sample with no Adogen, the receding adhesion tension for the aqueous phase with the metal in the presence of the organic layer $A^r_{sab}$ is about 10 dyne/cm, but there is no measurable adhesion tension of the electrolyte for the sample surface when the organic phase contains the positively-charged large organic cation Adogen 464.

Our invention for designing an organic coating for improved adhesion to steel under cathodic polarization is to graft a low concentration of fixed positively charged species onto the polymer backbone. Suitable inhibiting counter ions such as molybdate, borate or phosphate could be used to immobilize the positively charged species. This will give the coating a positive zeta potential and promote adhesion to cathodically polarized steel. This mechanism may, in fact, explain the enhanced corrosion resistance afforded by cathodically deposited organic coatings which most certainly would contain some residual positive charges.

While for our experiments Adogen TM 464 (methyl trialkyl ($C_8$–$C_{10}$) ammonium chloride supplied by Aldrich Chemical Co.) was used to supply the positively charged species, it is clear that other high molecular weight cations could be used without departing from the scope of the invention.

What is claimed is:

1. A method of preventing the disbonding of an organic polymer film which has been bonded to a metal by adding large molecular weight organic cations which include long chain quaternay ammonium cations immobilized in said organic film with molybdate counter ions.

2. A method of preventing the disbonding of an organic polymer film which has been bonded to a metal by adding large molecular weight organic cations which include long chain quaternay ammonium cations immobilized in said organic film with borate counter ions.

3. A paint which contains a polymer to which large molecular weight organic positive ions which consist of long chain alkyl quaternay ammonium cations with counter ions of molybdate have been added so that the paint has high bonding strength in the presence of polarization potentials.

4. A paint which contains a polymer to which large molecular weight organic positive ions which consist of long chain alkyl quaternay ammonium cations with counter ions of borate have been added so that the paint has high bonding strength in the presence of polarization potentials.

* * * * *